US012793056B2

(12) United States Patent
Kell et al.

(10) Patent No.: US 12,793,056 B2
(45) Date of Patent: Nov. 10, 2026

(54) ESTABLISHING DIGITAL ACCOUNT USAGE IN DIGITAL WALLETS DURING CROSS-PLATFORM DATA PROCESSING

(71) Applicant: PAYPAL, INC., San Jose, CA (US)

(72) Inventors: David Kell, Tokyo (JP); Masaki Teranishi, Kamakura (JP); Seina Udagawa, Kawasaki (JP)

(73) Assignee: PAYPAL, INC., San Jose, CA (US)

( * ) Notice: Subject to any disclaimer, the term of this patent is extended or adjusted under 35 U.S.C. 154(b) by 183 days.

(21) Appl. No.: 18/303,511

(22) Filed: Apr. 19, 2023

(65) Prior Publication Data

US 2024/0354752 A1 Oct. 24, 2024

(51) Int. Cl.

| | |
|---|---|
| ***G06Q 20/38*** | (2012.01) |
| ***G06Q 20/10*** | (2012.01) |
| ***G06Q 20/36*** | (2012.01) |
| ***G06Q 20/40*** | (2012.01) |

(52) U.S. Cl.

CPC ......... *G06Q 20/3829* (2013.01); *G06Q 20/10* (2013.01); *G06Q 20/36* (2013.01); *G06Q 20/4012* (2013.01)

(58) Field of Classification Search

None

See application file for complete search history.

(56) References Cited

U.S. PATENT DOCUMENTS 10,853,776 B1 12/2020 Grier
11,699,152 B2 7/2023 Scott et al.
11,868,974 B2 1/2024 Godsey
12,493,871 B1 * 12/2025 Vaniotis ............. G06Q 20/3672
2016/0065370 A1 * 3/2016 Le Saint ................ H04L 9/321 713/155
2018/0341861 A1 11/2018 Katz et al.
2019/0034927 A1 1/2019 Kumbhar et al.
2020/0042989 A1 2/2020 Ramadoss et al.
2020/0250683 A1 8/2020 Padmanabhan et al.
2020/0387887 A1 12/2020 Rathod (Continued)

OTHER PUBLICATIONS

International Search Report and Written Opinion for Application No. PCT/US2024/024804, mailed on Jul. 12, 2024, 14 pages.

(Continued)

*Primary Examiner* — Chrystina E Zelaskiewicz
(74) *Attorney, Agent, or Firm* — Haynes and Boone, LLP

(57) ABSTRACT

There are provided systems and methods for establishing digital account usage in digital wallets during cross-platform data processing. A user may engage in a transaction with another user, such as a purchase of goods, services, or other items a merchant using a digital wallet, such as through a software application. An online transaction processor may provide a digital account for payment processing, which may provide financing and installment loan payment services. Where the payment account may not be compatible with the protocols and procedures for use with the digital wallet, a specific identifier may be provisioned, and proxy data may be generated between the transaction processor's system and the digital wallet's system through exchanged calls and data. The identifier may imitate data used by the digital wallet and may also allow for tokenization and processing with token service providers on payment networks.

20 Claims, 9 Drawing Sheets

(56) References Cited

U.S. PATENT DOCUMENTS

| | | | | |
|---|---|---|---|---|
| 2021/0279699 | A1* | 9/2021 | Royyuru | G06Q 20/363 |
| 2021/0374756 | A1 | 12/2021 | Pandey et al. | |
| 2022/0020016 | A1* | 1/2022 | Scott | G06Q 20/40 |
| 2023/0080322 | A1 | 3/2023 | Smith et al. | |
| 2024/0185191 | A1* | 6/2024 | Bernardi | H04L 9/50 |

OTHER PUBLICATIONS

Desai R., "Digital Transaction," Feb. 13, 2017, 145 pages, retrieved from internet URL: https://drrajivdesaimd.com/2017/02/13/digital-transaction/.

* cited by examiner

ESTABLISHING DIGITAL ACCOUNT USAGE IN DIGITAL WALLETS DURING CROSS-PLATFORM DATA PROCESSING

TECHNICAL FIELD

The present application generally relates to cross-platform usage of digital wallets with separate accounts and more particularly to establishing and utilizing a digital account in a digital wallet provided by a separate online platform.

BACKGROUND

Users may utilize online transaction processors for processing payments between different entities through device applications and digital accounts. Further, these online transaction processors may also provide payment options, loans, and/or extensions for in-person transaction processing and use at merchant locations. When extending payment options and installment loan offers or plans, users may receive a credit and/or purchase limit and/or may be capable of utilizing a credit balance, real funds, or virtual funds linked to a digital account. Such balances may be used via the digital accounts provided to users by the online transaction processors. Further merchants may utilize in-person payment terminals, such as point-of-sale (POS) devices that may include components and modules for local wireless exchanges of data and transaction processing. However, digital wallets and mobile software applications may have specific requirements, configurations, and/or specifications for data transfer and interactions with mobile devices to utilize these terminals, which may be incompatible with certain data processing schemes. This may be the case where specific transactions and other data processing requests require analysis in real-time at the time of request processing with the merchant device. Further, due to threats of cyber-attacks, phishing schemes, and malware that may compromise the user's account, the user and online transaction processor may desire to enforce preemptive and/or real-time restrictions on account usage via separate platforms, which may require specific integrations of data processing operations, API calls and responses, and data formats for proper data handling and processing. Thus, it is desirable for online transaction processors to provide cross-platform account integration and usage operations with external digital wallet providers.

Figure 1:
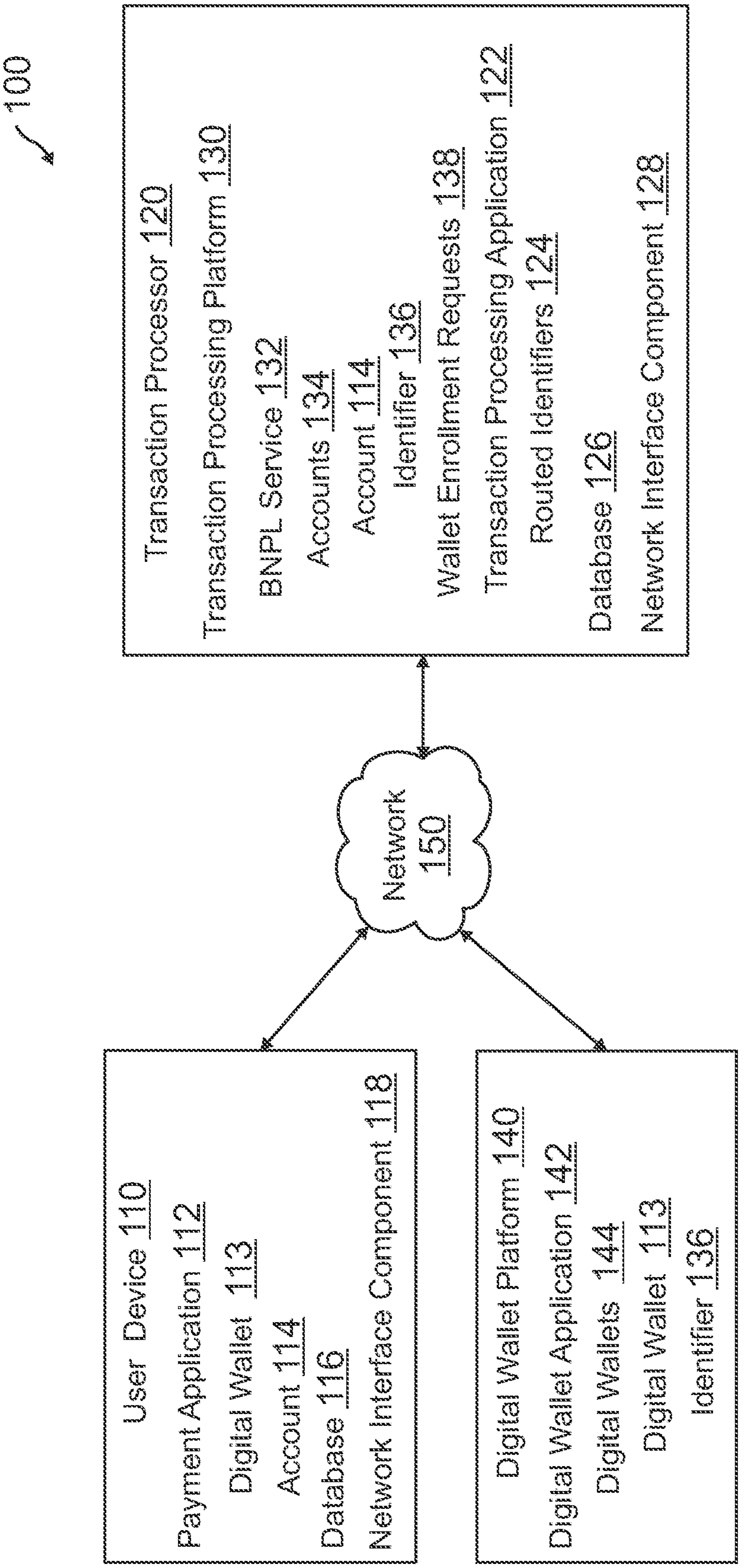
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for establishing digital account usage in digital wallets during cross-platform data processing, as well as cross-platform usage of digital accounts in separate digital wallets during data processing. Systems suitable for practicing methods of the present disclosure are also provided.

A user may utilize a digital account, payment card, and/or other funding source to process payments through an electronic payment and/or transaction network associated with a backend payment processor or other entity on the network. An identifier may be linked to a digital account of the user with an online transaction processor, such as a payment service provider (e.g., PayPal® and/or Paidy®), which may provide electronic transaction processing services to users through the account and one or more websites and/or applications of the online transaction processor or a merchant. The digital account may be established with a credit limit and/or may have a balance or value available for use with the digital account. The online transaction processor may include an integration with the electronic payment network (e.g., for payment cards, tokens, and the like) that allows for data exchange and communications between the two networks. Further, this payment network may provide data communications and backend processing devices that provide for interaction with frontend merchant, POS, and/or payment terminal processing devices that process transactions using data transfers, such as via digital, online, and/or contactless payments including near field communications (NFC), radio frequency identification (RFID) fields and communications, Bluetooth or WiFi communications, infrared scanners and/or communications, EMV chip reader, magnetic stripes and/or emulation readers, and other in-person and/or local data transfers.

However, to utilize such payment mechanisms and networks, specific data transfer and/or digital wallet protocols, systems, and communications may be required. Conventionally, buy now, pay later (BNPL) and/or installment loan balances and accounts may require approval and/or decisioning (e.g., risk and/or fraud analysis) in real-time and/or at the time and occurrence of transaction processing. This may be incompatible with standard digital wallet protocols, which may not have proper digital tokens, identifiers, and other data generated and provisioned for transaction processing using the digital wallet with merchant devices via short range wireless communications. Thus, the online transaction processor may provide operations to onboard and register, with a digital wallet and digital wallet provider that provides short range wireless transaction processing services, a digital account providing BNPL, installment loans, and/or other payment services (e.g., for established balances, budgets, and/or loans that may have recurring or refreshing amounts due each time cycle or time period and/or may provide delayed or financed payments). This may be done by generating and/or provisioning a particular identifier, such as a bank identification number (BIN), that complies with corresponding standards for identifier usage with the payment networks, token service providers (TSPs), and/or wireless payment terminals and devices (e.g., International Organization for Standardization (ISO) and/or International Electrotechnical Commission (IEC) standards including ISO/IEC 7812). Such identifiers may be provisioned for contactless payment providers, such as QUICPay™ and/or iD™, that may provide for components and operations for contactless payments via short range wireless communications. These identifiers may then be registered and stored for the account with the digital wallet and used during wireless and/or contactless payment processing. These identifiers used for contactless payments may be provided through cardless provisioning where a physical payment card or other article is not required for provisioning the identifiers. Instead, the cardless provisioning of identifiers may establish the BIN and/or other data necessary for payment processing at wireless payment terminals without registering and/or utilizing a payment card through the mobile application and digital wallet.

In this regard, a user may desire to purchase items via a software application and/or digital account on a mobile device that provides values, credit, or other funds to the user through an online transaction processor and/or electronic payment network. Selection of one or more items in an in-person transaction at a physical merchant location may require a payment instrument from the user for electronic transaction processing, which may be provided through a token, identifier, data package, or the like that is transmitted to a merchant device at the location, such as via short range wireless communications (e.g., contactless payments via NFC, RFID, etc.). A user may pay for one or more transactions using a digital wallet that is set up and configured to utilize contactless payment terminals and devices with a payment network, where the digital wallet includes an account with an online service provider or other transaction processor. A digital account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including digital account (e.g., credit/debit card) information, bank account information, gift card information, benefits/incentives, and/or financial investments, when processing transactions with merchants and/or other users or entities. Account creation may also be used to establish account funds and/or values, such as by transferring money into the account and/or establishing a credit limit and corresponding credit value that is available to the account and/or card. The service provider may provide computing services to send, store, and receive money, process financial instruments, and/or provide transaction histories, including generating of identifiers (e.g., BINs and the like used for funding payment/primary account number (FPAN) and/or device payment/primary account number (DPAN) fields and processing). The service provider may also provide for tokenization of data for transaction processing. The application or website of the service provider, such as PayPal® or other online payment provider, may provide payments and the other transaction processing services. Moreover, the digital account may be utilized through one or more mobile applications for mobile devices or other software applications.

In order to pay for the transaction (e.g., a transfer or payment to another user, merchant, or other entity), the user may provide the digital account or funding source information and/or may login to an account with the service provider through authentication information in a software application. When providing in-person payments through contactless payment terminals and a mobile device, a digital wallet of an external wallet or service provider may be utilized with the account to provide data to the terminal or device wirelessly. In this regard, an identifier and/or digital token or other data may authorize and/or authenticate the user for their digital wallet use and/or a payment instrument in the digital wallet (e.g., the account with the online transaction processor), which may be transmitted to another party for payment processing via wireless communications. The data may be stored by and/or transferred using one or more storage mediums and/or wireless transceivers, such as an NFC/RFID component, fob, passive or active antenna, etc., a magnetic stripe or an EMV chip, a displayable code or data, or the like. For example, a POS device and/or card reader may be used to read provisioned data for the identifier, which may mimic or imitate card data from a wireless card, using a merchant device at a merchant location. This may allow for user payments through a payment account and/or digital wallet through short range wireless communications and contactless processing. A payment may then be issued to the other party to the transaction.

In order to onboard, with a digital wallet and wallet provider platform, a user's digital account for BNPL or other payment processing mechanisms that may not conventionally be established or associated with certain identifiers and protocols for contactless payments, the online transaction processor may provide operations to first receive and process a request for onboarding and/or account establishment with the separate digital wallet (e.g., Apple® wallet for ApplePay®). A request for onboarding and/or establishment may be received, such as through a software application (e.g., a mobile or other resident dedicated application) or website for the online transaction processor providing the digital account, or via the digital wallet platform and digital wallet's application/website. Once received (e.g., at a frontend, such as the application/website of the transaction processor for the account), a primary account identifier for the account may be requested and received from a host system or backend system or server of the transaction processor. An eligibility check of the account with the digital wallet and digital wallet provider may also be performed, which may include querying and/or determining whether a payment account addition and/or secure element addition may be performed by the digital account's application with the digital wallet.

If eligible for addition of the account to the digital wallet and use of the account via the digital wallet (e.g., for contactless payments), the account's frontend application or website may then provide the user with an option and/or interface to add the account to the wallet and/or advance through the flow and interfaces for account addition to the wallet. The application may then request that the account be added to the digital wallet with the wallet provider. The wallet provider may retrieve certificates from a backend server or system of the wallet provider, which may include public certificates that provide for trust mechanisms and digital signing, as well as secure connection establishment. The public certificates may be returned to the digital wallet platform and/or frontend application or wallet, which provides the certificates back to the account's application, website, or other frontend during account registration and establishment for the digital wallet. A nonce (e.g., random value that is non-repeating) may be returned with the public certificates from the backend server or system, and a nonce signature with the nonce may be provided to the account's frontend with the certificates.

The online transaction processor, via the frontend application or website, may receive these certificates, nonce, and/or nonce signature, which may then encrypt this data with the primary account number of the account and provide to a backend (e.g., server, processor, device, or other system) of the transaction processor. This may be provided through an application programming interface (API) call or request and the backend may correspond to a host or the like. The host may then provide an API response having an encrypted primary account number (PAN), which may correspond to the BIN or other identifier. The identifier provided in the encrypted PAN may correspond to an identifier specifically generated and/or provisioned to the account from a contactless provider that provides contactless payment processing on the payment network used by the merchant devices and digital wallets for contactless payment processing. Further, the host may provide a cryptographic one-time password (OTP) and/or ephemeral public key for the transaction processor. Once received by the frontend of the transaction processor for the account, the frontend may then interact with the digital wallet to set and establish the identifier (e.g., as the encrypted PAN), cryptographic OTP, and/or ephemeral public key with the digital wallet for usage of the account during contactless payment processing. Specifically, the identifier may be used and/or entered in a FPAN or DPAN field during registration of the account with the digital wallet to enable payment processing through tokenization and TSPs, where the identifier may be a BIN that allows for resolution of payment processing on the payment network with the transaction processor. For example, the identifier may identify the account and transaction processor on the network for payment processing and may be compatible with and used by TSPs and tokenization operations for contactless payments.

Thereafter, finalization of registration may be completed by the digital wallet with the account holder or user of the account and digital wallet and the other servers, systems, and/or backends for the transaction processor, digital wallet, and/or payment network. For example, the data established with the digital wallet may be passed to a server for the digital wallet and a validation of the data may be performed. A TSP compatible with the BIN or other identifier may be determined, and a network check card with the encrypted PAN or other identifier and ephemeral public key may be provided to the TSP (e.g., FeliCa® TSP or the like. The TSP may transmit an API request for card eligibility from the host of the transaction processor, which may provide an API response for a product identifier and issuer card identifier. Thereafter, the TSP may provide terms and conditions to the digital wallet, which may be requested from the user via the transaction processor's application or website. Once agreed, the digital wallet may provide activation data to the TSP, which may request and receive card digitization from the transaction processor host. A token may be issued by the TSP for the identifier to the digital wallet as a DPAN, which may be detokenized to determine the identifier and allow for transaction processing during contactless payments. The digital wallet may then respond to the user via the frontend of the transaction processor with a successful activation and establishment of the account with the digital wallet.

Once the digital account is opened and registered with the digital wallet for use in contactless payments, the user may obtain, provide, and/or receive an available balance that may be utilized by the user. This may correspond to a real or virtual asset or value and may be a revolving credit limit extended to the user. The user may receive a set balance and/or installment loan or other loan extension, as well as authorizations and limitations on individual transaction processing (e.g., for a BNPL type account and/or payment authorization or balance). In this regard, the user's budget or BNPL extension may include, for example, $2,000 of credit repayments or balance payments (e.g., a payoff of the extended credit's balance) in a revolving credit billing cycle or time period, or may be approved on a per transaction basis for credit extension and payments in a BNPL-type payment authorization and plan. A BNPL-type plan for a user may allow users to finance or receive a loan for part or all of a transaction balance. In this regard, determination of the loan, loan extension and terms (including interest rate, fees, repayment schedule and/or timeline, number of payments, installment loan payment amount, etc.), and the like may be determined in real-time during the transaction and/or at a time associated with the transaction. Thus, each individual transaction may require approval on a per transaction basis or a batched group of transactions that have been collected, occur at or near the same time, or the like.

The user may utilize a mobile and/or resident software application on a computing device and/or a website to utilize the digital account and/or digital accounts credit limit via the digital wallet. These interfaces may allow the user to view and/or request processing of transactions and payments based on one or more rules, regulations, and/or budgets that are associated with the user. For example, governmental and/or regulatory laws or rules may set an available limit for a user. Further, the user's budget, income, past repayment data, credit rating, or other user data may set those limits. Those limits may further be determined using a rules-based and/or machine learning (ML)-based artificial intelligence (AI) engines that may precompute and recompute such limits based on real-time and/or available user data, as well as merchant data, merchant agreements, and other data. Further, such AI and ML engines may also be used at the time of transactions to compute and/or determine risk, fraud likelihood, repayment or loss risk or potential, and the like, which may be used to determine whether to approve or reject payments and transactions including those utilizing BNPL plans and requests. Thus, risk and fraud engines, models, and/or rulesets may be used to authorize, approve, and/or decline transactions for the account that are requested via the digital wallet (e.g., using contactless payment mechanisms and the payment network/TSPs).

A transaction may be processed using the digital account (s) through the digital wallet and contactless payment terminals/devices, which may generate and process transaction data for the transaction on a digital payment network having backend payment processors and TSPs. The transaction data may be generated and include information, such as identification of one or more items, item costs (e.g., itemizations) and/or a total cost, a transaction time, a corresponding merchant or merchant identifier, other users involved in the transaction, a transaction location, an MCC identifying a particular category for each transaction, and/or other transaction data. The online transaction processor may provide electronic transaction and payment processing services used to process the transaction using the transaction data and/or card data. In order to receive this data, the online transaction processor may be required to interface with a backend card processor, TSP, and/or electronic card, payment, or transaction network that transmits, receives, and/or processes the transaction data based on associated payment instrument data. In this regard, the online transaction processor may utilize an application programming interface (API) to communicate and integrate with one or more APIs of the electronic payment network. This allows the online transaction processor to detect, receive, and process the transaction data. Thereafter, the transaction data may be detected and/or transmitted to the online transaction processor via one or more APIs. This may include receiving and processing the data in real-time, such as when the transactions occur in order to provide per transaction approval and authorization for BNPL plans.

When the transaction data for a transaction is received by the online transaction processor when the transaction is requested to be processed, the transaction data may then be analyzed to determine whether the transaction is authorized and can be approved or is declined based on a risk assessment or analysis. To receive transaction data for a transaction, a data transfer, reading, and/or scanning event may occur for the corresponding transaction information generated by a merchant device. For example, a mobile device may utilize a mobile application for the digital wallet having data stored and usable for the digital account of the transaction processor. The mobile device may interact with a nearby or proximate POS or other merchant device and/or terminal, which may include a reader or scanner for a magnetic strip, EMV chip, NFC or RFID transceiver, or the like, that reads data from a local device or data storage mechanism. The mobile device may provide, via the digital wallet and/or corresponding mobile application, the identifier (e.g., the BIN) that has been provisioned and/or generated for the account for use with TSPs and other backend processors on the payment network. The mobile device may utilize the digital wallet to transmit a token including the identifier, which may be previously established (e.g., the DPAN token for the BIN provided by the TSP to the digital wallet) or generated for the transaction based on the identifier. This may be provided via contactless payments and short range wireless communications from the mobile device to the merchant device (e.g., through a local transceiver or other terminal communication module), where authorization and processing of the DPAN or other token is requested on the payment network.

The online transaction processor may be established with the payment network to receive incoming communications from the payment network, merchants, point-of-sale (POS) devices, and the like, as well as identifying electronic transaction payments requested through a digital account. When processing the transaction, the merchant device, after receiving the token or other data for the identifier via the contactless reading or data transfer, the merchant device may request authorization on the payment network with a backend payment processor or system (e.g., QUICPay™ and/or iD™), which may have the token detokenized using a TSP associated with the token and tokenization of the identifier (e.g., by converting the DPAN to FPAN or the like for the BIN or other identifier). The identifier, once detokenized, may then be processed by the online transaction processor with the transaction data for approval or declination of the transaction.

For example, if the transaction complies with the limit, then the online transaction processor may approve the transaction or allow the transaction to be approved on the payment network (e.g., by not declining the transaction or requesting the electronic card network and/or backend credit card processing system to decline the transaction). However, if the transaction violates the limit or otherwise does not comply with the limit (e.g., if the transaction amount causes the balance of the digital account and/or digital account to exceed the limit balance cap), then the online transaction processor may decline the transaction by refusing to process the transaction and/or requesting that the network and/or backend processing system reject or decline the transaction. If the transaction exceeds or violates the limit, the online transaction processor may refuse processing of the transaction and/or transmit a message having a notification or alert to a device of the user. The device may include an application having one or more interface options, elements, or graphics that may include an executable option, operation, and/or selectable element to view approvals or declinations of transaction processing, as well as transaction status, balances, loan information, and the like.

In this manner, accounts that utilize real-time and/or at transaction occurrence approval and authorization mechanisms may be made compatible with digital wallets and digital wallet providers that are separate from the account's transaction processor. This allows for integration and use of digital accounts with previously incompatible computing systems and networks for data processing including tokenization requirements and TSPs. Further, the operations to provide a specific identifier utilized through the digital wallet allow for disparate systems to coordinate and transmit data in a fast and efficient manner that allows for real-time data processing and transaction authorization during contactless payment in-person and/or at physical merchant and other seller locations. Therefore, a system may be coordinated for use of previously incompatible data formats, components, and networks that would otherwise prevent usage and interactions between such platforms.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110, a transaction processor 120, and a digital wallet platform 140 in communication over a network 150. User device 110 may be used to establish a transaction and process a payment for the transaction using an account managed by user device 110. In this regard, when the transaction is processed, the transaction data may be provided over a transaction network, which may be available over network 150 to transaction processor 120. User device 110 may utilize a digital wallet provided by digital wallet platform 140 to process transactions using contactless payment systems in-person and/or through wireless communications and communication protocols. Transaction processor 120 may onboard the account utilized by user device 110 with digital wallet platform 140 and register the account with TSPs and other processors and protocols used by the payment network for use with the digital wallet provided by digital wallet platform 140.

User device 110, transaction processor 120, and digital wallet platform 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented using any appropriate hardware and software configured for wired and/or wireless communication with merchant devices, payment terminals, contactless payment transceivers and devices, and/or transaction processor 120 for processing a transaction using a digital wallet provided by digital wallet platform 140. User device 110 may correspond to a user that processes payments and sales through an executable software application. In various embodiments, user device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

User device 110 of FIG. 1 contains a payment application 112, a database 116, and a network interface component 118. Payment application 112 may correspond to executable processes, procedures, and/or applications with associated hardware. In other embodiments, user device 110 may include additional or different modules having specialized hardware and/or software as required.

Payment application 112 may correspond to one or more processes to execute software modules and associated components of user device 110 to provide features, services, and other operations for a user over network 150, which may include accessing and utilizing computing services provided by transaction processor 120 and/or digital wallet platform 140. In this regard, payment application 112 may correspond to specialized software utilized by a user of user device 110 that may be used to access a website or application (e.g., mobile application, rich Internet application, or resident software application) that may display one or more user interfaces that allow for interaction with the computing services of transaction processor 120 and/or digital wallet platform 140. In various embodiments, payment application 112 may correspond to a general browser application configured to retrieve, present, and communicate information over the Internet (e.g., utilize resources on the World Wide Web) or a private network. For example, payment application 112 may provide a web browser, which may send and receive information over network 150, including retrieving website information, presenting the website information to the user, and/or communicating information to the website. However, in other embodiments, payment application 112 may include a dedicated application of transaction processor 120, digital wallet platform 140, or other entity. Payment application 112 may be used to access and utilize a digital wallet 113 provided and/or services by digital wallet platform 140, which may incorporate an account 114 provided and services by transaction processor 120, where account 114 may provide BNPL services, installment or financing loans, and the like for purchases.

Payment application 112 may be associated with account information, user financial information, and/or transaction histories. However, in further embodiments, different services may also be provided via payment application 112, including social networking, media posting or sharing, microblogging, data browsing and searching, online shopping, and other services available through transaction processor 120. Thus, payment application 112 may also correspond to different service applications and the like. When utilizing payment application 112 with transaction processor 120, payment application 112 may request processing of a transaction, such as a payment request and/or contactless data transfer for payment processing using account 114 with transaction processor 120. Data for account 114 may be provided by digital wallet 113 during contactless payments via corresponding protocols, operations, and/or applications for digital wallet 113 and/or digital wallet platform 140.

For example, a payment request for a transaction or other interaction may correspond to utilizing payment application 112 to request, establish, and/or process a transaction for payment using account 114, which may utilize real-time and/or per transaction approval and authorization mechanisms (e.g., for BNPL-type financing and/or payment). Digital wallet 113 may be used for transmitting a BIN or other identifier generated and/or provisioned for account 114 on the payment network for contactless payments, which is tokenized and/or encoded as a DPAN or other FPAN compliant token. Such identifier and token for account 114 may be generated during onboarding and establishment of account 114 for use with digital wallet 113, which may be processed by transaction processor 120 with digital wallet platform 140, as discussed herein. Thereafter, the token may be transmitted wirelessly, such as through short range wireless communications for contactless payment protocols, devices, and technology, via operations for digital wallet 113, which allows account 114 to be used for payment of the transaction. Payment application 112 may provide a payment request to one or more contactless payment devices, terminals, transceivers, or the like with one or more merchants via the tokenized identifier for account 114 using the protocols for digital wallet 113 after registration. Thereafter, payment application 112 may be used to view the results of transaction processing and the like via one or more interfaces.

In various embodiments, user device 110 includes other applications as may be desired in particular embodiments to provide features to user device 110. For example, the other applications may include security applications for implementing client-side security features, programmatic client applications for interfacing with appropriate application programming interfaces (APIs) over network 150, or other types of applications. The other applications may also include email, texting, voice and IM applications that allow a user to send and receive emails, calls, texts, and other notifications through network 150. In various embodiments, the other applications may include financial applications, such as banking applications. Other applications may include social networking applications, media viewing, and/or merchant applications.

The other applications may also include location detection applications, which may be used to determine a location for the user, such as a mapping, compass, and/or GPS application, which can include a specialized GPS receiver that determines location information for user device 110. The other applications may include device interface applications and other display modules that may receive input from the user and/or output information to the user. For example, the other applications may contain software programs, executable by a processor, including a graphical user interface (GUI) configured to provide an interface to the user. The other applications may therefore use components of user device 110, such as display devices capable of displaying information to users and other output devices, including speakers.

User device 110 may further include database 116 stored on a transitory and/or non-transitory memory of user device 110, which may store various applications and data and be utilized during execution of various modules of user device 110. Database 116 may include, for example, identifiers such as operating system registry entries, cookies associated with payment application 112 and/or the other applications, identifiers associated with hardware of user device 110, or other appropriate identifiers, such as identifiers used for payment/user/device authentication or identification, which may be communicated as identifying the user/user device 110 to transaction processor 120. Moreover, database 116 may include data for digital wallet 113 and/or account 114, which may include identifiers and/or tokens used for contactless and/or wireless payment processing and data transfers via digital wallet and payment protocols and networks provided by transaction processor 120 and digital wallet platform 140.

User device 110 includes at least one network interface component 118 adapted to communicate with transaction processor 120, digital wallet platform 140, and/or other devices and servers over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction processor 120 may be maintained, for example, by an online service provider, which may provide processes to provide account services and process payments. In this regard, transaction processor 120 includes one or more processing applications which may be configured to interact with user device 110, digital wallet platform 140, and/or another device/server to facilitate communications and transactions between users. Transaction processor 120 may be maintained by or include another type of platform or service provider, for example, a transaction processor such as PAYPAL®, Inc. of San Jose, CA, USA. Although transaction processor 120 and digital wallet platform 140 are discussed as separate devices and servers, in some embodiments, one or more of the described processes of may instead be provided by the other device or server, or the same device or server.

Transaction processor 120 of FIG. 1 includes a transaction processing platform 130 having a transaction processing application 122, a database 126, and a network interface component 128. Transaction processing platform 130 and transaction processing application 122 may correspond to executable processes, procedures, and/or applications with associated hardware. In other embodiments, transaction processor 120 may include additional or different modules having specialized hardware and/or software as required.

Transaction processing platform 130 may correspond to one or more processes to execute modules and associated specialized hardware of transaction processor 120 to process a transaction for item(s) with user device 110 and one or more merchant or seller devices, which may be based on account 114 being registered and established with digital wallet 113 for in-person, short range wireless, and/or contactless payments, data transfers, communications, and the like. In this regard, transaction processing platform 130 may correspond to specialized hardware and/or software used by users with a BNPL service 132 to establish accounts 134 including account 114 used by user device 110. Accounts 134 may each be created by providing personal and/or financial information to transaction processor 120 and selecting authentication credentials. In various embodiments, the financial information may include payment instrument information, such as account/card numbers and information. The account may be used to purchase items and/or transfer funds. The payment account may be accessed and/or used through a browser application and/or dedicated payment application. However, in other embodiments, accounts 134 may be used with digital wallet platform 140 for transaction and payment processing through digital wallets provided by digital wallet platform 140, such as by using digital wallet protocols and operations for payment processing including contactless data transfers and payment processing. BNPL service 132 may be used to request and/or receive transaction limits, approval for transactions in real-time or on a per transaction basis for BNPL-type loans and/or financing, and the like. BNPL service 132 may process a payment and may provide a transaction history for transaction authorization, approval, or denial.

BNPL service 132 may correspond to a service of transaction processor 120 that may be utilized by end users, such as to perform electronic payments, transfers, and the like using one or more accounts and/or financial instruments. BNPL service 132 may also include or utilize different processors, engines, or models as required for an authentication, account setup and maintenance, electronic transaction processing, deposit and/or withdrawal, dispute resolution, and the like. BNPL service 132 may include one or more API integrations and/or interactions with payment networks in order to detect, receive, and monitor transaction data for approval and/or compliance with spending limits for accounts 134. Thus, BNPL service 132 may interact with the network through one or more API calls to APIs of transaction processing platform 130 that interfaces with APIs of the digital payment networks and backend processors. BNPL service 132 may determine transaction data for transactions processed on the network based on received communications and may process such transactions in real-time and/or on a per transaction basis based on risk of repayment, fraud, default, or the like for the user, transaction, and/or account.

BNPL service 132 may receive the transaction data for transactions processed using the account accessible through user device 110 and/or other devices or servers. BNPL service 132 may then determine spending limits set on usage of a balance, credit limit, and/or other funds available to the digital account of the user, as well as account data used to perform a real-time risk analysis, assessment, and check to approve or decline the corresponding transaction. In this regard, an AI engine of transaction processing platform may be executed to calculate risk and/or availability for an installment loan, financing, or the like based on user data, budgets, account assets or balances, available or future funds, and the like. Using the API calls with the payment network on network 150, devices (e.g., user device 110 and/or merchant, POS, or payment devices) and their corresponding transactions may be detected and processed. BNPL service 132 may determine whether the transactions comply with the spending limit(s) and/or may be authorized and approved in real-time and/or for the specific transaction. If so, the transaction may be approved or authorized. However, if the transaction does not comply with the spending limit or exceeds risk or a limit on approval of electronic transaction processing and/or credit/balance limit, then BNPL service 132 may be used to decline transaction processing or instruct a backend credit processor to decline processing of the transaction. Further, BNPL service 132 may transmit a message to user device 110 and/or another device to notify the user of approval or denial of the transaction.

In some embodiments, BNPL service 132 may employ one or more AI engines and/or models, such as rules-based, ML, or neural network (NN) models and/or engines, which may be used for intelligent decision-making of risk and/or transaction approval. These may include rules-based engines that may process user data, transaction data, and/or merchant data, which may be used to determine transaction approval for requested transactions at a time or occurrence of the transaction. Further, BNPL service 132 may utilize machine learning engines or other AI models or engines to determine risk and/or transaction approval. In some embodiments, machine learning engines may include AI models, such as ML or neural network (NN) models. AI models may generally correspond to any artificial intelligence that performs decision-making, such as rules-based engines and the like. However, AI models may also include subcategories, including ML models and NN models that instead provide intelligent decision-making using algorithmic relationships. Generally, NN models may include deep learning models and the like, and may correspond to a subset of ML models that attempt to mimic human thinking by utilizing an assortment of different algorithms to model data through different graphs of neurons, where neurons include nodes of data representations based on the algorithms that may be interconnected with different nodes. ML models may similarly utilize one or more of these mathematical models, and similarly generate layers and connected nodes between layers in a similar manner to neurons of NN models.

When building ML models for machine learning engines, training data may be used to generate one or more classifiers and provide recommendations, predictions, or other outputs based on those classifications and an ML model. The training data may be used to determine input features for training predictive scores and/or outputs for risk, transaction approval or denial, and the like when a transaction is requested to be processed using accounts 134, where accounts 134 may be utilized via one or more digital wallets and digital wallet platform 140 with merchant or payment devices. For example, ML models for machine learning engines may include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output scores or classifications. Within the input layer, each node may correspond to a distinct attribute or input data type that is used to train ML models for machine learning engines.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML models for machine learning engines that attempt to classify and/or provide an output for transaction approval. Thus, when ML models for machine learning engines are used to perform a predictive analysis and output, the input may provide a corresponding output based on the classifications trained for ML models for machine learning engines.

ML models for machine learning engines may be trained by using training data. By providing training data to train ML models for machine learning engines, the nodes in the hidden layer may be trained (adjusted) such that an optimal output (e.g., a classification) is produced in the output layer based on the training data. By continuously providing different sets of training data and penalizing ML models for machine learning engines when the output of ML models for machine learning engines is incorrect, ML models for machine learning engines (and specifically, the representations of the nodes in the hidden layer) may be trained (adjusted) to improve its performance in data classification. Adjusting ML models for machine learning engines may include adjusting the weights associated with each node in the hidden layer. Thus, the training data may be used as input/output data sets that allow for ML models for machine learning engines to make classifications based on input attributes. The output classifications for an ML model trained for machine learning engines may be classifications used for risk and/or transaction processing by BNPL service 132.

Further, transaction processing platform 130 processes wallet enrollment requests 138 to enroll accounts 134 with digital wallets provided by digital wallet platform 140. Wallet enrollment requests 138 may correspond to received requests to enroll accounts 134 with corresponding digital wallets for use of accounts 134 by those digital wallets, such as when performing contactless or short range wireless transaction processing and other data transfers. This may be done by provisioning and/or generating BINs or other identifiers that may be tokenized as a PAN, such as a DPAN, or other token used for processing on a payment network for contactless payments. In this regard, a digital wallet may require an FPAN or DPAN field during enrollment of an account or financial instrument for contactless payments made via the digital wallet, which may be done using the provisioned BIN or other identifier. For example, with one of wallet enrollment requests 138, identifier 136 may be generated and/or provisioned for use with digital wallet 113 to utilize account 114 via the wallet for electronic transaction processing via contactless payments and/or other payment processing using digital wallet 113. This may be done in conjunction with digital wallet platform 140, TSPs and the like for tokenization/detokenization, backend processors and payment networks, and the like that interact with frontends (e.g., frontend processors, servers, systems, devices, etc.) for digital wallet 113, account 114, and/or application/websites for transaction processor 130 and/or digital wallet platform 140. Examples of such identifiers, tokens, components, and operations to establish and utilize identifier 136 and other identifiers for accounts 134 with digital wallets are further discussed with regard FIGS. 2A-5B below.

Transaction processing application 122 may correspond to one or more processes to execute modules and associated specialized hardware of transaction processor 120 to process a transaction or provide another service to customers, merchants, and/or other end users and entities of transaction processor 120. In this regard, transaction processing application 122 may correspond to specialized hardware and/or software used by transaction processor 120 to providing computing services to users, which may include electronic transaction processing and/or other computing services using accounts 134 provided by transaction processor 120, such as in response to receiving transaction data with routed identifiers 124 for electronic transaction processing of transactions initiated using digital wallets having registered accounts 134. In some embodiments, transaction processing application 122 may be used by users, such as a user associated with user device 110, to establish user and/or payment accounts, as well as digital wallets, which may be used to process transactions. Accounts 134 may be accessed and/or used through one or more instances of a web browser application and/or dedicated software application executed by user device 110 and engage in computing services provided by transaction processing application 122. Computing services of transaction processing application 122 may also or instead correspond to messaging, social networking, media posting or sharing, microblogging, data browsing and searching, online shopping, and other services available through transaction processor 120.

In various embodiments, transaction processing platform 130 may be desired in particular embodiments to provide features to transaction processor 120. For example, transaction processing platform 130 may include security applications for implementing server-side security features, programmatic client applications for interfacing with appropriate application programming interfaces (APIs) over network 150, or other types of applications. Transaction processing platform 130 may contain software programs, executable by a processor, including a graphical user interface (GUI), configured to provide an interface to the user when accessing transaction processor 120 via one or more of user device 110, where the user or other users may interact with the GUI to view and communicate information more easily. In various embodiments, transaction processing platform 130 may include additional connection and/or communication applications, which may be utilized to communicate information to over network 150.

Additionally, transaction processor 120 includes database 126. Database 126 may store various identifiers associated with user device 110. Database 126 may also store account data, including payment instruments and authentication credentials, as well as transaction processing histories and data for processed transactions. Database 126 may store received data associated with a user, such as transaction data and spending limits on electronic transaction processing. Further, database 126 may be used to store data for accounts 134, which may be used for generating, storing, and/or transferring identifiers and/or tokens used for account enrollment and establishment with digital wallets and processing of transactions via accounts 134.

In various embodiments, transaction processor 120 includes at least one network interface component 128 adapted to communicate with user device 110, digital wallet platform 140, and/or another device/server over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Digital wallet platform 140 may be maintained, for example, by a third-party, application provider, merchant, transaction processor, and/or other online service provider that provides, utilizes, and/or maintains digital wallets for user that may be used during electronic transaction processing. Digital wallet platform 140 may be utilized by one or more physical and/or online merchant marketplaces, sales platforms, point-of-sale (POS) devices, websites, and/or online resources where a user may visit in order to shop for items that may be purchased through processes and funds provided via the digital wallets maintained by digital wallet platform 140. For example, digital wallet platform 140 may be utilized with one or more POS devices at physical merchant locations to process transactions, as well as websites and/or applications accessible digital platforms, where a user may engage in electronic transaction processing. Digital wallet platform 140 may further include other platforms, websites, and resources that may allow users to engage in electronic transaction processing, such as those associated with payment processors, transfers of funds, payment of utilities or living expenses, and other payments or purchases that may be used by users and may require payment of a balance due for some product, service, or other item. In some embodiments, digital wallet platform 140 may be implemented as a single or networked personal computers (PCs), servers, a smart phone, laptop computer, wearable computing device, and/or other types of computing devices. Although only one wallet provider platform is shown, a plurality of platforms may function similarly.

Digital wallet platform 140 of FIG. 1 contains a digital wallet application 142. Digital wallet application 142 may correspond to executable processes, procedures, and/or applications with associated hardware. In other embodiments, digital wallet platform 140 may include additional or different software as required.

Digital wallet application 142 may provide and/or process transactions with and/or on behalf of user device 110 and/or a user associated with user device 110 (e.g., using one or more of digital wallets 144 having payment sources including a payment card, digital account, cash, etc., as well as accounts 134 that have been registered for use with digital wallets 144). In certain embodiments, digital wallet application 142 may be accessible over the Internet and provide digital wallets 144 for use with user device 110 and transaction processor 120 over network 150. Digital wallet application 142 may be utilized at a physical merchant location, such with a POS device used to provide sales at physical locations including contactless payments and transaction processing through data transfers using short range wireless communications, signals, and protocols. Digital wallet application 142 may therefore be used to onboard accounts 134 with digital wallets 144, including account 114 with digital wallet 113 using identifier 136. In this regard, digital wallet application 142 may be used to receive one or more identifiers, which may be tokenized and stored with digital wallets 144 for use in payment processing using payment networks, TSPs, other backend payment processors and systems, and the like, as discussed in further detail with regard FIGS. 2A-5B below. Payment may be provided using a digital account by routing transaction data with routed identifiers 124 back to transaction processor 120 for payment. After receipt of payment by a digital account and/or confirmation of a digital account transfer, digital wallet platform 140 may then process a payment to the merchant or other seller with transaction processor 120 using the account, identifier, and payment instrument, including financing or loans provided with BNPL-type loans or financing, which may be approved and/or processed in real-time and/or on a per transaction basis for approval.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
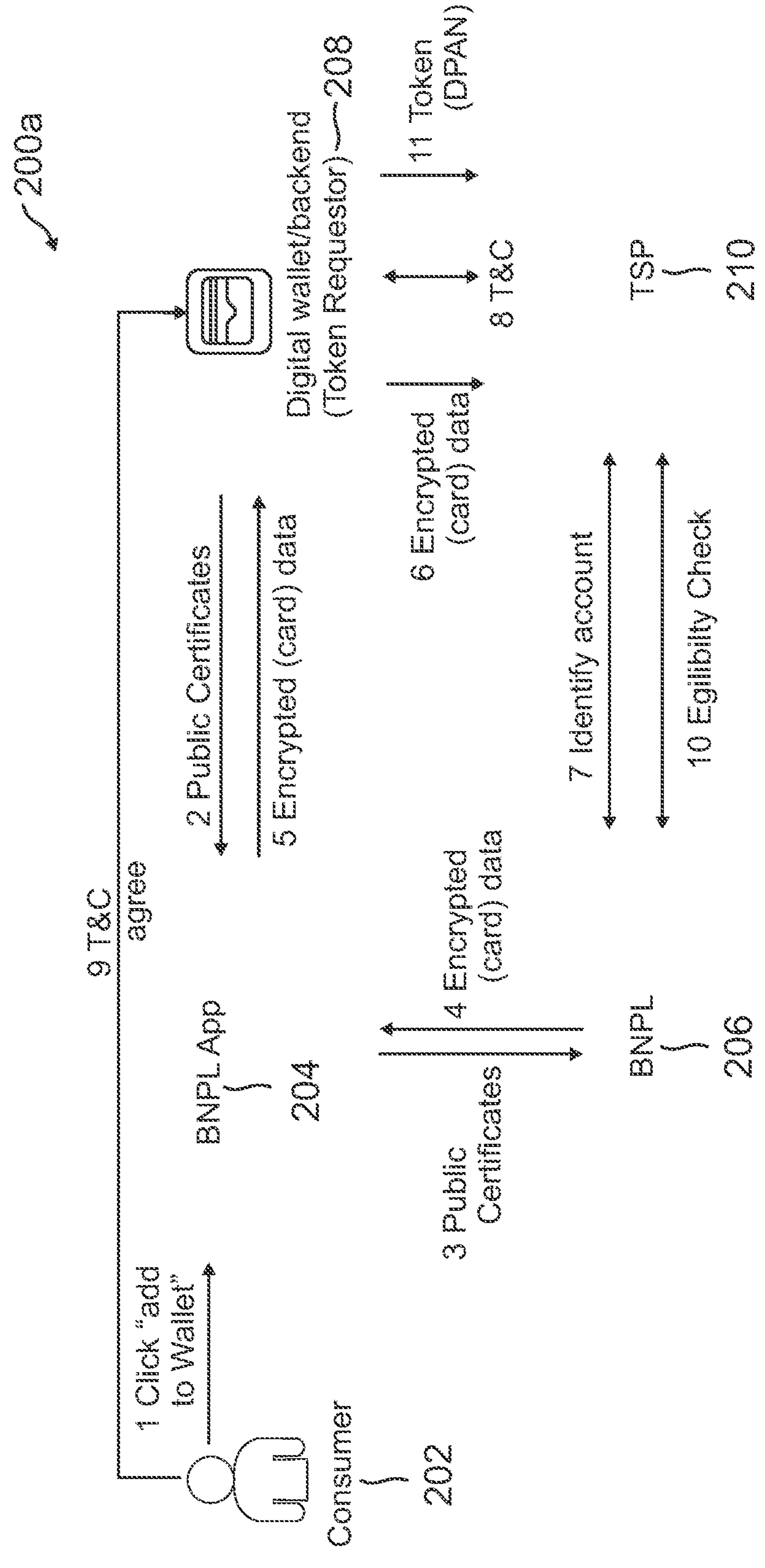
FIGS. 2A-2B are exemplary diagrams for establishing and utilizing a digital account for short range wireless data processing with merchant devices through a digital wallet provided by a separate platform, according to an embodiment.
Figure 2B:
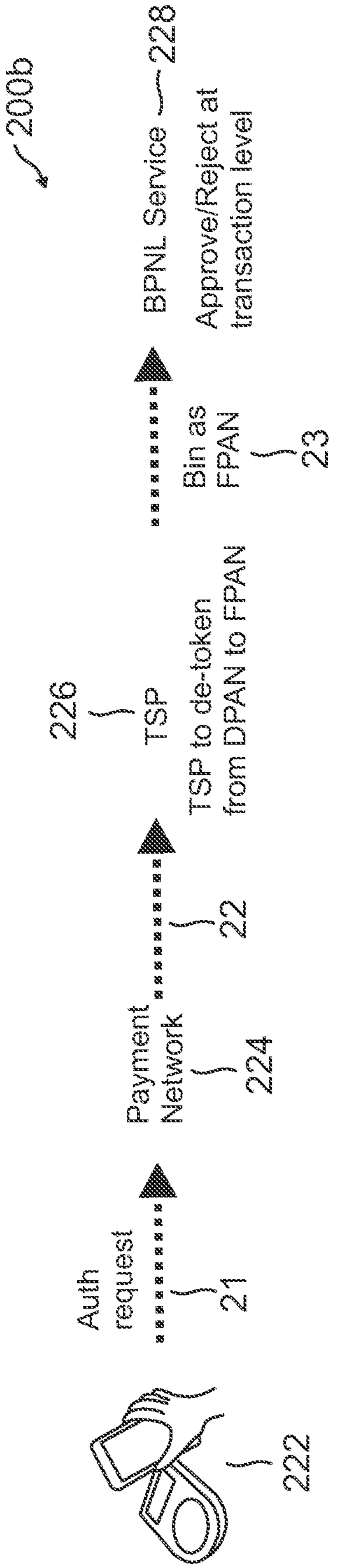

FIGS. 2A and 2B are exemplary diagrams 200*a* and 200*b* for establishing and utilizing a digital account for short range wireless data processing with merchant devices through a digital wallet provided by a separate platform, according to an embodiment. Diagrams 200*a* and 200*b* of FIGS. 2A and 2B may correspond to operational flows and data communications between devices, servers, and/or systems when interacting to provide contactless payments via a payment account using a digital wallet of a separate wallet provider, such as interactions between user device 110, transaction processor 120, and/or digital wallet platform 140 discussed in reference to system 100 of FIG. 1.

In diagram 200*a* of FIG. 2A, different interactions, inputs, data communications, and/or processing operations are shown in order to establish a digital account with a digital wallet for processing transactions using a payment network, such as with contactless payments and BNPL-type or other financing payment services. Initially at an interaction 1, a consumer 202, such as a customer of an online transaction processor or other service provider that may process transactions with merchants and other sellers, may interact with a BNPL application 204 to request addition of an account to a digital wallet with a separate digital wallet provider from the online transaction processor providing the account. The account may correspond to a BNPL-type account and/or account that utilizes BNPL services, such as to finance transactions through loans, installment loans and/or periodic repayment plans, and other financing services. The account may therefore require real-time and/or per transaction risk and fraud analysis, processing, and/or approval via the digital wallet. Thus, the account may initially be incompatible with the digital wallet and/or payment network used by the digital wallet Consumer 202 may interact with BNPL application 204 via a dedicated software application and/or website or web application, which may, at an interaction 2, retrieve and/or obtain public certificates from a digital wallet and backend 208. The digital public certificates may be used for trust operations, such as to sign and verify signature, as well as establish a chain of trust to verity other certificates, that allow for secure communications, trusted data and signatures, and the like. Thus, the public certificates may be used for generating and/or provisioning an identifier (e.g., a BIN or other identifier, number, alphanumeric code, etc.) for an account used for trusted payment processing, as well as other signing and trust operations during payment processing and other account or digital wallet activities. BNPL application 204 then, at an interaction 3, provides the public certificates to a BNPL backend 206, which stores the public certificates. Prior to transfer to BNPL backend 206 and/or storage, the public certificates, with any nonce or nonce signature, may be encrypted for secure storage. At an interaction 4, BNPL backend 206 responds to BNPL application 204 with encrypted data, such as encrypted card data that may imitate or mimic a credit, debit, or other payment card by having an identifier (e.g., a BIN) that may be used on card processing and/or payment networks and/or with card processing terminals including contactless, RFID, NFC, or other short range wireless terminals, devices, transceivers, and communications for payment processing. The identifier for the provisioned and/or proxy card or other data may be generated and/or provisioned for the account to be compatible with the corresponding payment network and TSP, such as TSP 210. Thus, the identifier may correspond to a BIN that may allow entry into a form field for account registration with a digital wallet in an FPAN field or other PAN field allowing for tokenization and use of the corresponding payment network.

At an interaction 5, the encrypted (card) data is transmitted from BNPL application 204 to digital wallet and backend 208 for processing, where digital wallet and backend 208 may correspond to the token requestor. Digital wallet and backend 208 may recognize the encrypted data as provisioned or proxy data imitating or mimicking card data, such as a BIN for a payment card, that may be used for electronic transaction processing via the digital wallet. The data may be encrypted using shared keys, such as a public key from the public certificates, and therefore digital wallet and backend 208 may decrypt and verify the data for registration of the account. Thus, the encrypted data may include an identifier to be registered and/or stored with the account, which may be tokenized as a DPAN or other FPAN-type format for use with payments on a payment network. At an interaction 6, the encrypted data and/or the identifier is provided from digital wallet and backend 208 to a token service provider (TSP) 210, which may tokenize the data for storage and use during electronic transaction processing. TSP 210 may correspond to a computing service that generates a token to represent data without revealing the data for security, where resolution of the token to receive and/or process the data may be resolved with TSP 210.

In order to register the account and identifier with digital wallet and backend 208, BNPL backend 206 performs an identification and/or process an identification check of the account with TSP 210 at an interaction 7. TSP may provide a DPAN, FPAN, or other PAN-type data token for use with a payment network. At an interaction 8, terms and conditions are provided to digital wallet and backend 208, which requests approval and agreement to the terms and conditions from consumer 202 at an interaction 9. Consumer 202 may then agree to the terms and conditions of use of the digital wallet and account through the digital wallet for payment processing including contactless and/or short range wireless data transfers and payment processing. At an interaction 10, BNPL backend 206 performs an eligibility check with TSP 210 for the account and identifier for tokenization and use on the payment network, where the token may be generated in response to a determination that the account and/or identifier is eligible. At an interaction 11, the token, such as a DPAN for the identifier or other data from the encrypted data provided by digital wallet and backend 208, is returned from TSP 210 to digital wallet and backend 208 for storage. The token may be stored with and/or for the digital wallet of consumer 202 and in association with the digital account and/or BNPL-type payment services available to consumer 202. Thus, the token may enable electronic transaction processing including contactless payment processing through card and/or contactless payment terminals. The API calls and data processing events for establishing an account with a digital wallet in FIG. 2A and further described with regard to FIGS. 3A and 3B below.

In diagram 200*b* of FIG. 2B, different interactions, inputs, data communications, and/or processing operations are shown in order to process a payment from a digital account with a digital wallet using a payment network, such as with contactless payments and BNPL-type or other financing payment services. At an interaction 21, a contactless payment terminal 222 reads, receives or detects short range wireless signaling and/or communications, and/or otherwise determines a data transfer of a data token representing or acting as a proxy for card or similar data has occurred from a contactless device or object to contactless payment terminal 222. For example, a mobile phone may be used to open a software application or website via a web browser application and request electronic transaction processing by transmitting data to a nearby or proximate device via short range wireless communications. Contactless payment terminal 222 may then read or receive this data, and, at an interaction 21, may request authorization for a corresponding transaction based on the read or received data transfer of the proxy card data or other data (e.g., a token or the like) representing the identifier allowing for payment processing using the application.

Authorization may be requested from a payment network 224, such as QUICPay™ and/or iD™, which provides payment networks to process and resolve digital tokens between frontend contactless devices and terminals, mobile devices and applications, websites, digital wallet services, and the like with backend payment networks, processors, and the like. Payment network 224, at an interaction 22, provides the read, scanned, or received proxy data, such as a token for the identifier, to a TSP 226, which may detokenize the token to another form or identifier capable of identifying the correspond backend processor, host, or system that processes a payment for the transaction. TSP 226 detokenizes a token, such as a DPAN, to corresponding data, such as a BIN or other identifier, and, at an interaction 23, provides the detokenized data with transaction data to a BNPL service 228 or other computing service that processes transactions in real-time for an account and/or on a per transaction basis to provide an approval or denial of the transaction. Such processing may be based on risk assessments and factors, user data and/or balances, extended credit or loans, and the like, which may be used to determine eligibility for financing and/or BNPL services and funds for the transaction.

Figure 3A:
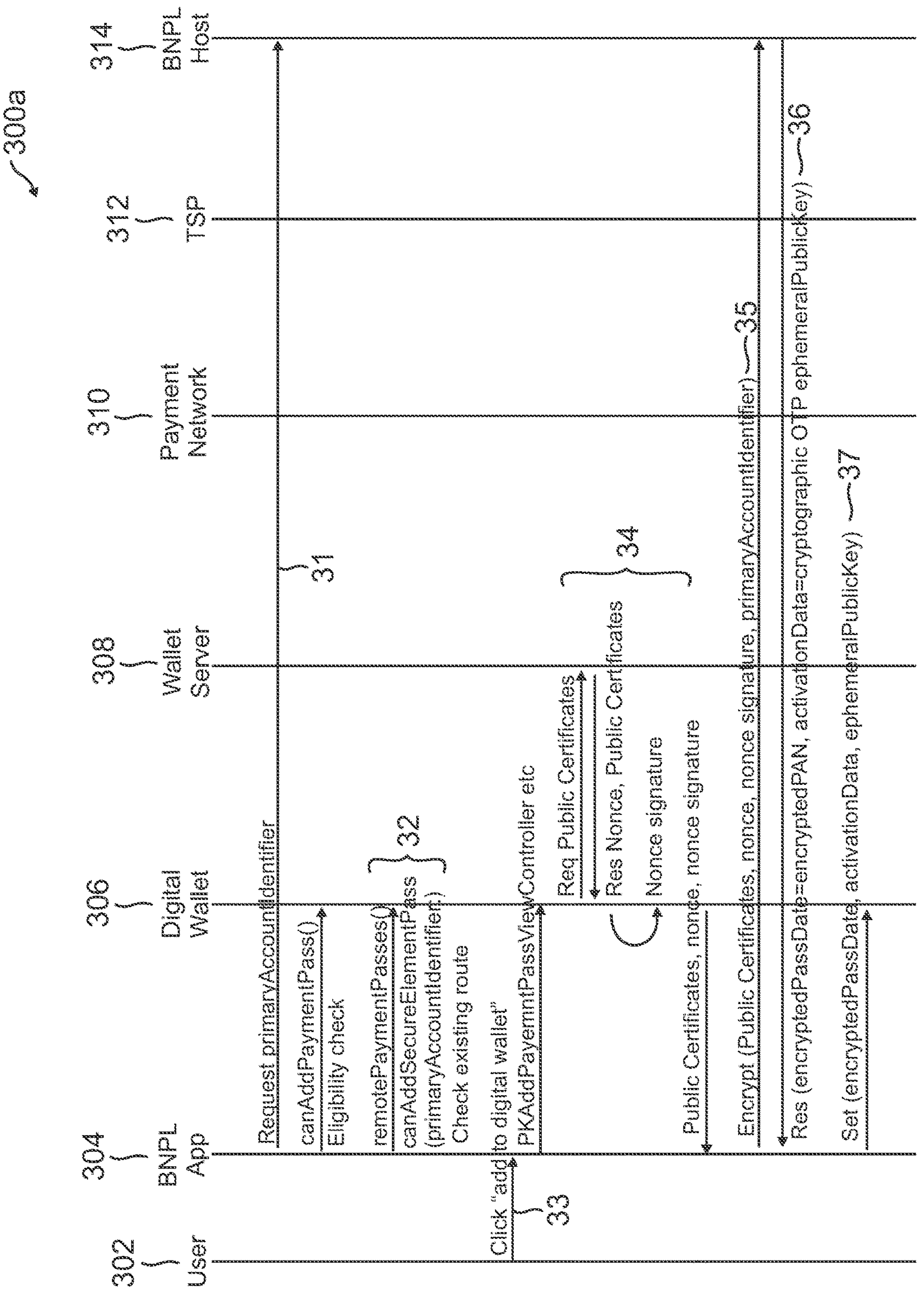
FIGS. 3A-3B are exemplary diagrams of data processing calls and operations between online transaction processor systems and digital wallet provider systems when establishing and onboarding a digital account with a digital wallet, according to an embodiment.
Figure 3B:
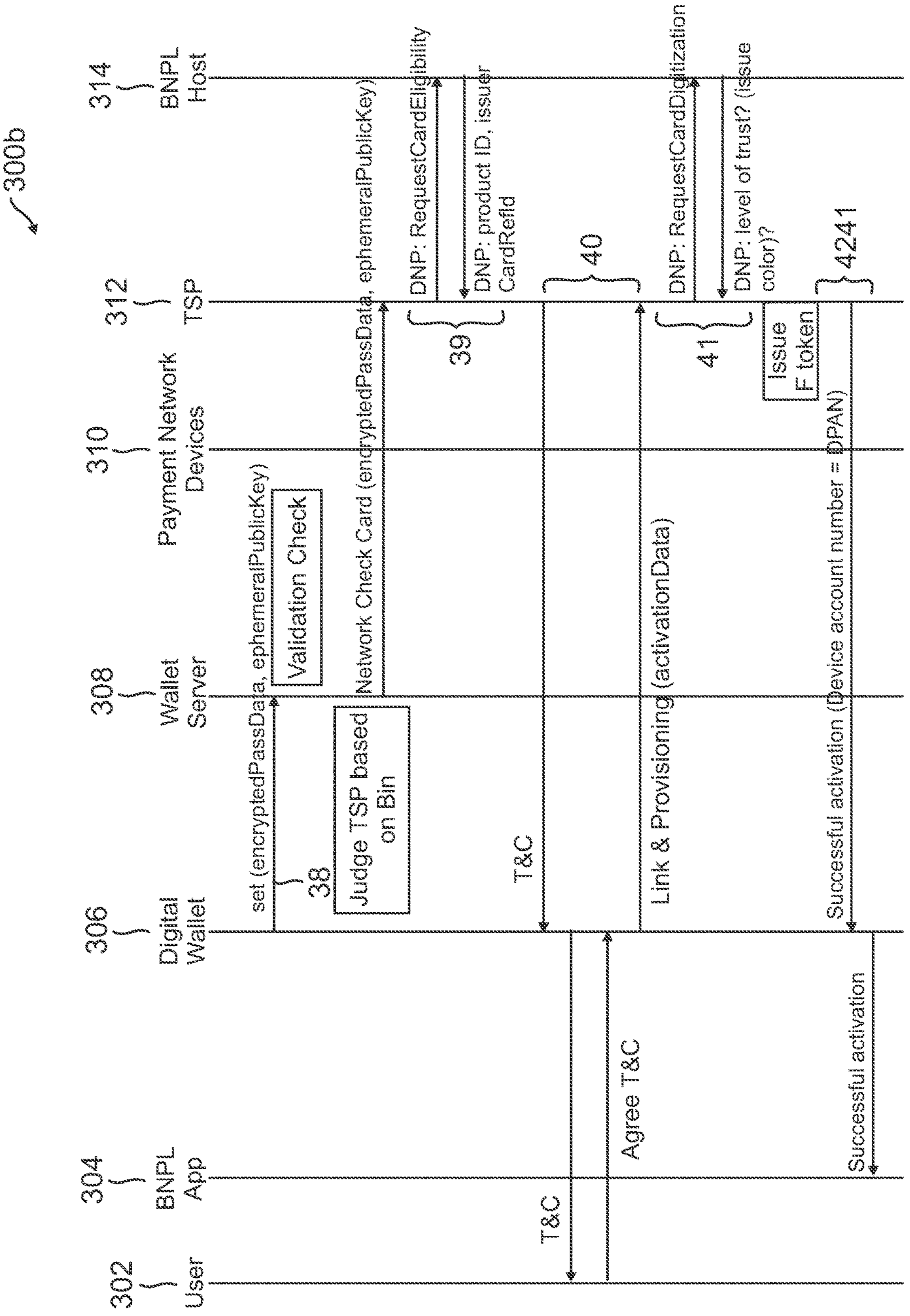

FIGS. 3A and 3B are exemplary diagrams 300*a* and 300*b* of data processing calls and operations between online transaction processor systems and digital wallet provider systems when establishing and onboarding a digital account with a digital wallet, according to an embodiment. Diagrams 300*a* and 300*b* of FIGS. 3A and 3B include API calls and data processing events from interactions between devices, servers, applications, and/or systems that may be used to establish use of a digital account, such as one that provides BNPL-type payment services, with a digital wallet as a payment instrument. In this regard, such interactions may be performed by user device 110, transaction processor 120, and/or digital wallet platform 140 discussed in reference to system 100 of FIG. 1.

The interactions between user device 110, digital wallet platform 140, and transaction processor 120 may be used to configure a digital wallet for use of a specific digital account as a payment or funding instrument during electronic transaction processing including contactless payment processing and systems. Initially, a user 302 may utilize a BNPL application 304 for use of a digital account with BNPL payment and financing services. User 302 may further have a digital wallet 306 with a separate digital wallet platform that utilizes a wallet server 308 to provide computing services via applications and websites, as well process data using backend components, servers, systems, and the like. Payments may be processed via a payment network 310, which may interact with a TSP 312 for tokenization/detokenization of data, such as identifiers that may be processed with a BNPL host 314 for payment and/or transaction approval, authorization, and/or payment.

At an interaction 31, BNPL application 304 first requests a primary account number (PAN) from BNPL host 314 through an API call or request, which may correspond to the primary identifier or the like that serves as identification for processing the account of user 302. BNPL application 304 further, at an interaction 32, performs an eligibility check with digital wallet 306 to determine eligibility of adding the account and/or BNPL payment processing services to digital wallet 306 as a payment instrument for payment processing with in-person and/or digital payments and transactions. This may include executing an API call for the eligibility check and check of existing routes for secure element addition. Thereafter, and if the eligibility check is passed so that BNPL application 304 and/or digital wallet 306 may provide an option to enroll and/or register the account in the wallet, user 302 selects an option to add the account to digital wallet 306 at an interaction 33, which corresponds to an API call between BNPL application 304 and digital wallet 306 to request to add the account to digital wallet 306.

Based on the request, during an interaction 34, public certificates are retrieved and encrypted for use during the account enrollment process with digital wallet 306. Digital wallet 306 may first request, via an API request, public certificates for wallet server 308, which may respond with the public certificates and a nonce (random and/or nonrepeating value to guarantee initial or live data transference of the public certificates) to digital wallet 306 via an API response. Digital wallet 306 may generate a nonce signature using the none and may provide the nonce, nonce signature, and public certificates to BNPL application 304. At an interaction 35, BNPL application 304 then encrypts the public certificates, nonce, and nonce signature with the PAN for the account and transmits the encrypted data to BNPL host 314.

At an interaction 36, BNPL host 314 then provides an API response to BNPL application 304 with encrypted data having an encrypted PAN or other identifier. The encrypted PAN may correspond to a BIN or other identifier, where the BIN/identifier may be used as a DPAN for required fields (e.g., an FPAN or the like form fields when enrolling the account with digital wallet 306) during account enrollment). The API response may further include activation data as a cryptographic one-time password (OTP) and an ephemeral public key used for cryptographic operations, signing, and/or security. At an interaction 37, BNPL application 304 may set the encrypted PAN or other identifier, cryptographic OTP or other activation data, and ephemeral public key with wallet server 308 for use of the account with digital wallet 306. This may correspond to setting the encrypted data as proxy card data or similar proxy or provisioned data that imitates a funding or payment instrument (e.g., payment card) and completes the required fields for payment instrument enrollment of the account with digital wallet 306 as a usable payment instrument during electronic transaction processing. Thus, digital wallet 306 may utilize the set and established encrypted data for payment processing, such as in-person payments, contactless payments, wireless payments, and/or digital payments over a network.

Referring to FIG. 3B, in diagram 300*b*, operations may then be finalized to register and provide utilization of the digital account for user 302 with the BNPL service through digital wallet 306. At an interaction 38, digital wallet 306 and wallet server 308 set the encrypted PAN or other identifier and ephemeral public key for use, which includes a validation check of the data for validity of use as a payment mechanism in the digital wallet. At an interaction 39, wallet server 308 may judge or determine a TSP based on the BIN or other identifier used for the encrypted PAN, which may include a network check card request with the encrypted PAN and ephemeral public key with TSP 312 acting as the token provider for tokenization and detokenization procedures (e.g., FeliCa® TSPs and the like). TSP 312 may then check card eligibility with BNPL host 314 via an API call, which responds with a product identifier and issuer card reference identifier. Thereafter, TSP 312, during interaction 40, requests agreement to terms and conditions (T&C), which are provided to digital wallet 306 and thereafter forwarded or presented to user 302. User 302 agrees to the T&C with digital wallet 306 and activation data is transmitted to TSP 312. During interactions 41 and 42, activation is finalized where, during interaction 41, TSP requests card digitization, such as through tokenization, of the encrypted data with BNPL host 314, and BNPL host 314 provides a trust level for data tokenization and/or digitization. TSP 312 then issues a token at interaction 42, which is provided to digital wallet 306 for payment processing as a DPAN that may be detokenized from FPAN fields and/or data in a transaction to the BIN or other identifier for the digital account with digital wallet 306. Digital wallet 306 then displays the successful activation of the account with digital wallet 306 via the BNPL application 304.

Figure 4:
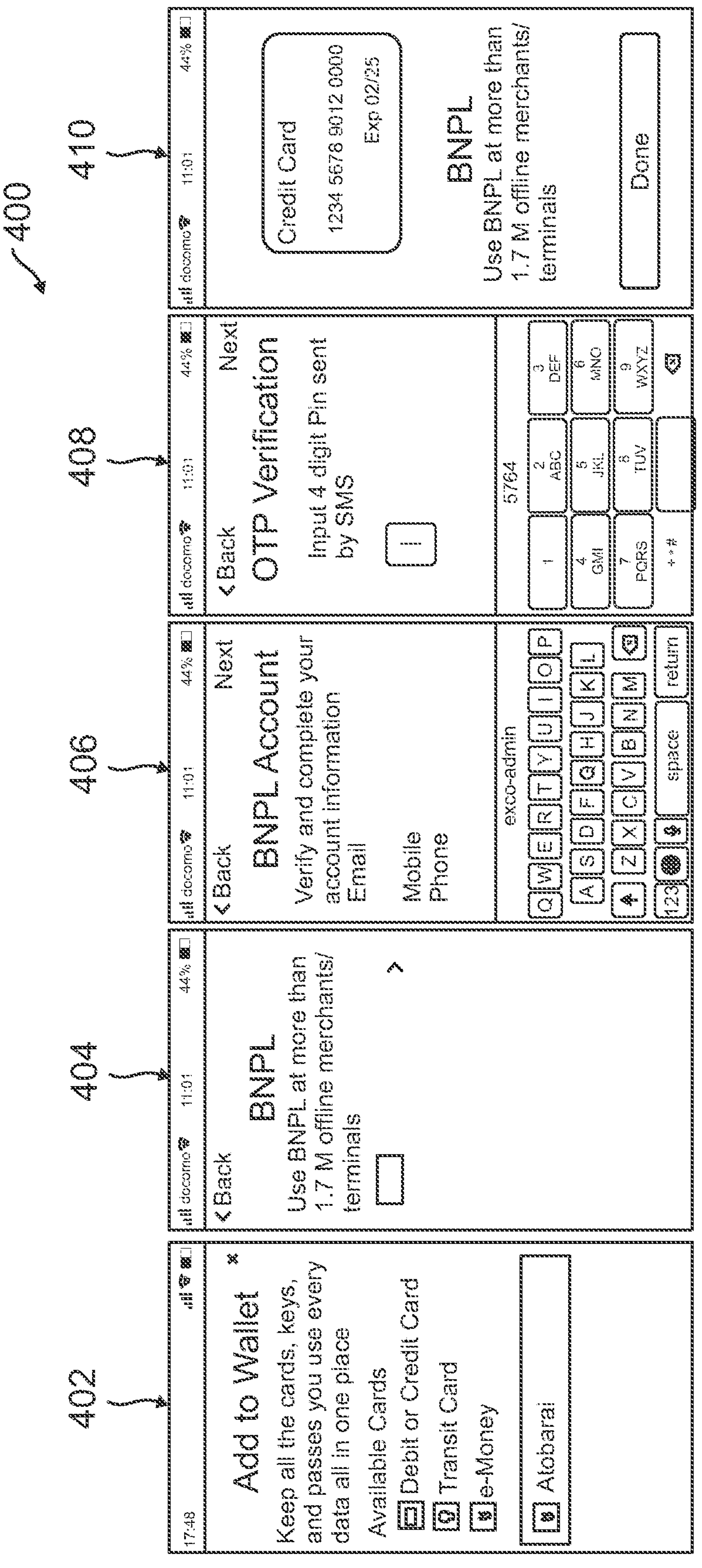
FIG. 4 is a set of exemplary user interfaces for a mobile device application when registering a digital account with an online transaction processor for use via a digital wallet of a separate digital wallet platform, according to an embodiment.

FIG. 4 is a set of exemplary user interfaces 400 for a mobile device application when registering a digital account with an online transaction processor for use via a digital wallet of a separate digital wallet platform, according to an embodiment. User interfaces 400 may be displayed on a computing device including a mobile smart phone or other mobile device, such as user device 110 discussed in reference to system 100 in FIG. 1. In this regard, user interfaces 400 include separate user interfaces 402, 404, 406, 408, and 410 that may be displayed when registering and/or onboarding a digital account with a digital wallet for use during payment and transaction processing.

In an interface 402 in FIG. 4, a software application, such as a desktop or mobile application, may present an interface that allows a user to request addition of payment instrument to a digital wallet including a digital account with a payment service separate from the digital wallet provider. For example, the digital account may provide transaction processing and payment services via BNPL computing services that approve transactions in real-time and/or on a per transaction basis, which may require specific operations for transaction approval at the time of a transaction and/or during transaction processing requests. In interface 402, an add to wallet request is shown where a user viewing interface 402 may then select to add a specific payment instrument, such as a card, key, pass, or other account including the BNPL or other digital account.

Once a request to add a payment instrument is selected from interface 402, in interface 404, a BNPL account addition is shown where a user may select an online transaction processor for the BNPL service and account for enrollment and registration in the corresponding digital wallet of the user. This may include selecting a card or account identifier that represents the account and online transaction processor and further informs the user that the account may be used with the digital wallet for in-person and/or contactless payment processing, such as through short range wireless communications. Selection of the transaction processor advances to an interface 406, which requests entry of identification and/or authentication credentials or other contact identifiers, such as an email and mobile phone number for verification and completion of account information. In some embodiments, a password or other secret may be requested for account login and/or verification.

If the contact and other verification information is entered, a two-factor or secret challenge may be issued to the user and/or user's secure or verified device or contact address/account (e.g., mobile phone number and text message, email address, etc.). For example, an OTP may be requested from the user's device in interface 408, where the OTP is sent to the trusted and/or verified device or account (e.g., via SMS, email, etc.). Interface 408 may then request that the user enter the OTP for verification. If entered and verified, interface 410 shows successful enrollment after proceeding with the aforementioned steps and operations to enroll and register the BNPL or other digital account with the digital wallet of the user. The application presenting interface 410 and/or another account or digital wallet application may then enable electronic transaction processing through the account.

Figure 5A:
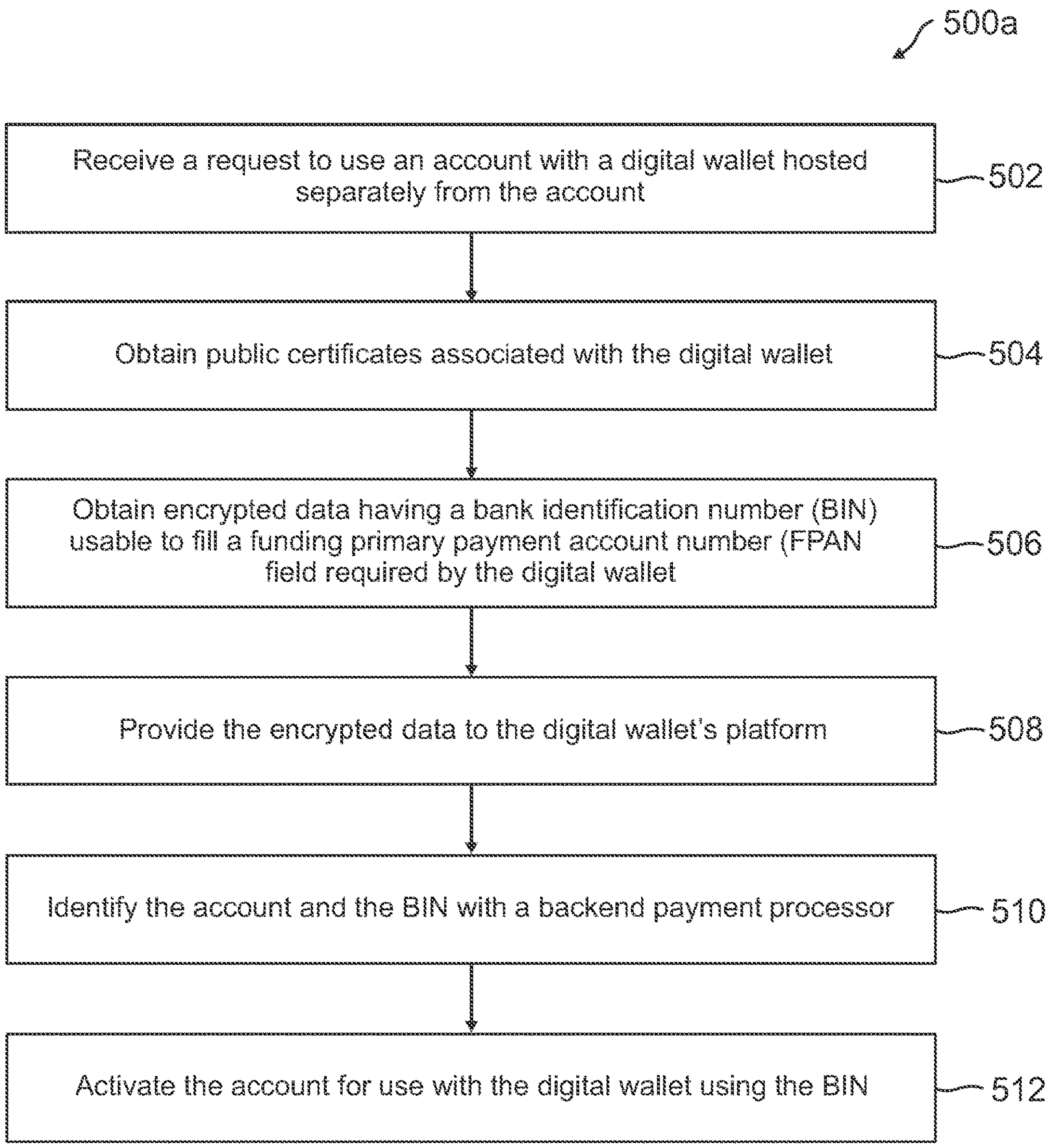
FIG. 5A is a flowchart of an exemplary process for establishing digital account usage in digital wallets during cross-platform data processing, according to an embodiment.

FIG. 5A is a flowchart 500*a* of an exemplary process for establishing digital account usage in digital wallets during cross-platform data processing, according to an embodiment. Note that one or more steps, processes, and methods described herein of flowchart 500*a* may be omitted, performed in a different sequence, or combined as desired or appropriate.

At step 502, a request to use an account with a digital wallet hosted separately from the account is received. The request may be received via a software application or website of an online transaction processor providing the account or of a digital wallet platform providing the digital wallet. The request may be received after the account is determined to be eligible and usable with the digital wallet, such as by determining a user's access and/or authorization for payment processing using the account. For example, the user may be confirmed to be eligible for installment loans or financing, such as with a BNPL-type system that provide per transaction approval and/or authorization based on a user's eligibility to receive financing, a loan or installment loan, or other extension of credit or funds to cover a particular transaction.

At step 504, public certificates associated with the digital wallet are obtained. The public certificates may be used for trust verification, digital signatures, encryption, and the like and may be used to verify a digital wallet provider and the like for secure communications with the online transaction processor when registering and enrolling the account with the digital wallet. At step 506, encrypted data having a BIN usable to fill an FPAN field required by the digital wallet is obtained. The encrypted data may include an identifier for the account, such as a PAN that may be encrypted and used as the FPAN or DPAN during tokenization and processing for payments may using the digital wallet. The encrypted data may also include or be associated with a cryptographic OTP, which may have been provided and verified during the request, and an ephemeral public key.

At step 508, the encrypted data is provided to the digital wallet's platform. API calls may be exchanged and processed between the platform and system for the online transaction processor and digital wallet provider, where the online transaction processor may provide the data for tokenization and later processing and use during electronic transaction processing. At step 510, the account and the BIN are identified with a backend payment processor. The online transaction processor may perform the identification in order to verify the account and BIN or other identifier on the payment network and to backend payment processors and systems including TSPs that may tokenize data. Once identified and verified, at step 512, the account is activated for use with the digital wallet using the BIN. This may then allow for transaction processing using the account via the digital wallet, such as for contactless payments using a token (e.g., a DPAN) for the encrypted data including the BIN or other identifier. This may require resolution on the payment network as discussed below with regard to FIG. 5B.

Figure 5B:
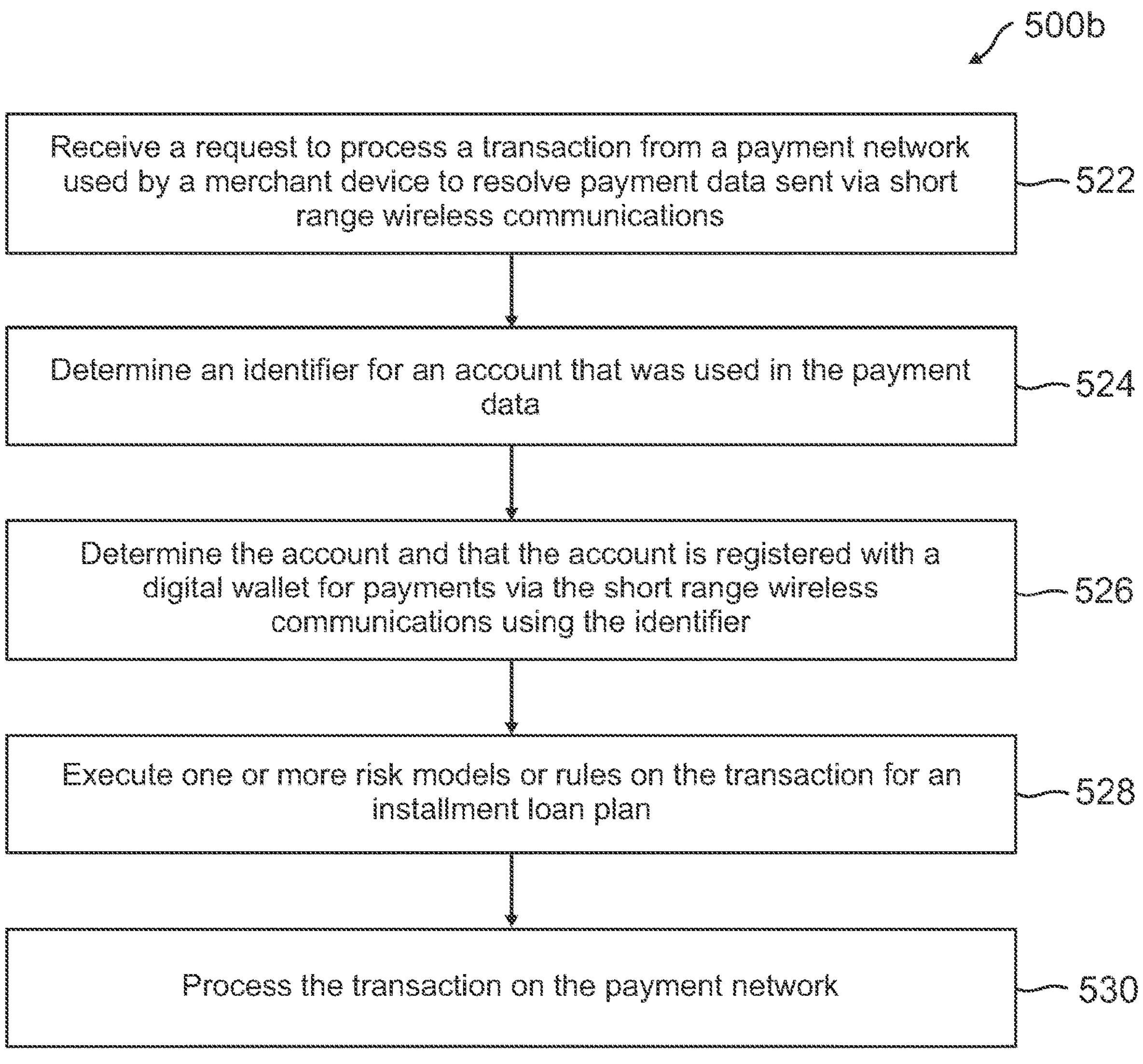
FIG. 5B is a flowchart of an exemplary process for cross-platform usage of digital accounts in separate digital wallets during short range data processing, according to an embodiment.

FIG. 5B is a flowchart 500*b* of an exemplary process for cross-platform usage of digital accounts in separate digital wallets during short range data processing, according to an embodiment. Note that one or more steps, processes, and methods described herein of flowchart 500*b* may be omitted, performed in a different sequence, or combined as desired or appropriate.

At step 522, a request to process a transaction is received from a payment network used by a merchant device to resolve payment data sent via short range wireless communications. For example, an interaction detected between a user and a merchant for an application used for electronic transaction processing may be identified, where the interaction may correspond to a data transfer of a token for a BIN or other identifier for an account. The interaction may be through short range wireless communications used to communicate the token via a contactless and/or wireless transmission to a corresponding payment device or terminal for the merchant. The merchant's device may the utilize a payment network and backend processor for processing of the received data including detokenization and use of the BIN or other identifier with transaction data to request transaction approval and payment. The transaction may be processed based on user data including user financial data, historical payment and/or repayment data, credit worthiness, and the like, as well as merchant data including merchant agreements for extendable credit levels, merchant balances and/or credit worthiness, and the like. Such data may be accessed from one or more data repositories, computing devices, and/or the like for the user and the merchant associated with such data.

At step 524, an identifier for an account that was used in the payment data is determined. The identifier may be determined from detokenizing the data transferred during the contactless or short range wireless data communications. This may be done by a TSP on the payment network used, which may provide operations to obtain an FPAN (e.g., the BIN or other identifier provisioned for the account) from a DPAN set with the digital wallet for the account. At step 526, the account and that the account is registered with a digital wallet for payments via the short range wireless communications are determined using the identifier. The online transaction processor providing the account may provide an account lookup and authentication operation to identify the account and determine parameters, funding sources, and/or authorizations for payments to be made via the account.

At step 528, one or more risk models or rules on the transaction is/are executed for an installment loan plan. For example, transaction, user, and/or merchant data may be received for the transaction, where data, features, and the like are extracted and processed by one or more transaction approval and risk engines of the online transaction processor. This may be performed to determine eligibility for the transaction to be approved, such as for a loan, financing, BNPL payment service, or the like. At step 530, the transaction is processed on the payment network. If the transaction is approved, a payment may be processed on the network to the corresponding account of the merchant or other seller. However, if the risk models or rules decline the transaction, the transaction may be declined, and processing refused on the payment network. A result, receipt, and/or transaction history may be provided over the network to the merchant's device, as well as the user's device and/or account.

Figure 6:
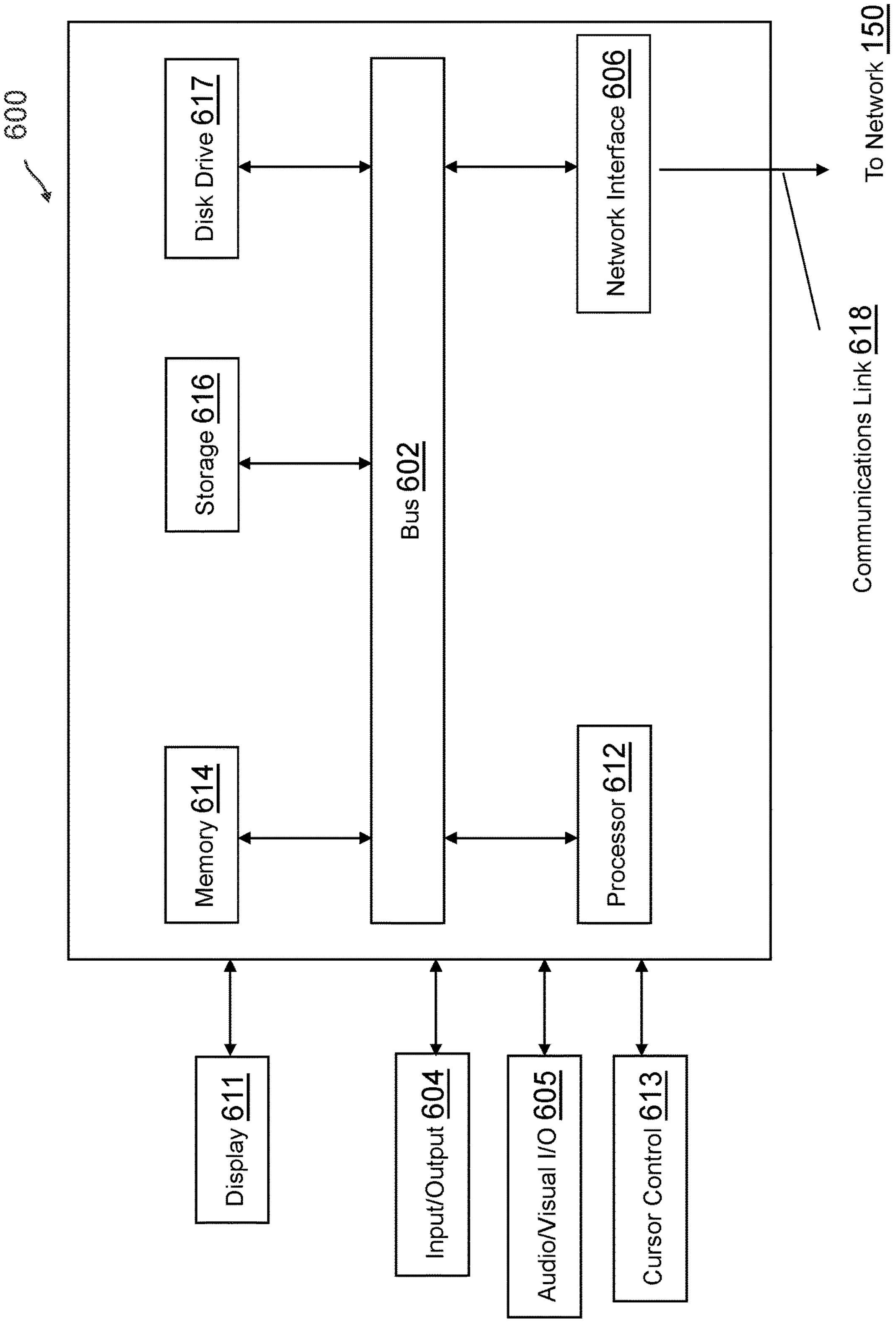
FIG. 6 is a block diagram of a computer system suitable for implementing one or more components in FIG. 1, according to an embodiment.

FIG. 6 is a block diagram of a computer system 600 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another communication device, service device, or a service provider server via network 150. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617.

Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:

a non-transitory memory; and one or more hardware processors coupled to the non-transitory memory that reads instructions from the non-transitory memory to cause the system to perform operations comprising:

detecting a request to add an account of a user with a payment processing service associated with the system to a digital wallet of the user, wherein the digital wallet is hosted by a digital wallet platform separate from the system;

determining proxy wallet data for the account of the user, wherein the proxy wallet data comprises an identifier uniquely identifying the account to a backend payment processing network and that enables contactless payment processing via short range wireless communications using the account via the payment processing service;

transmitting the proxy wallet data to the digital wallet platform in association with the request;

identifying the account of the user with the backend payment processing network that utilizes the identifier for processing transactions with the payment processing service;

receiving, from the digital wallet platform, a digital certificate, a nonce generated by the digital wallet platform, and a nonce digital signature;

encrypting the digital certificate, the nonce, and the nonce digital signature;

providing, to a backend of the system, an application programming interface (API) request comprising the encrypted digital certificate, the encrypted nonce, and the encrypted nonce digital signature;

determining an encrypted identifier that represents the account in the digital wallet from an API response received from the backend of the system and based on the encrypted digital certificate, the encrypted nonce, and the encrypted nonce digital signature;

entering the encrypted identifier to a field that represents an account number during adding of the account to the digital wallet;

activating the payment processing service for the account with the digital wallet of the user;

generating a digital token associated with the digital wallet, wherein the digital token is transferred via the short range wireless communications for the contactless payment processing using the account;

enabling the contactless payment processing for the digital wallet in an application on a device of the user;

detecting a transfer of the digital token to a data processing terminal via the short range wireless communications; and processing a transaction having the digital token used for the contactless payment processing by the data processing terminal based on the transfer.

2. The system of claim 1, wherein the determining the proxy wallet data comprises receiving the API response from the backend of the system that generates the proxy wallet data.

3. The system of claim 1, wherein the proxy wallet data is encrypted prior to transmitting to the digital wallet platform using a cryptographic key associated with the digital wallet platform.

4. The system of claim 1, wherein the operations further comprise:

passing the request to a frontend application of the digital wallet platform that generates or retrieves the digital certificate using a backend system of the digital wallet platform.

5. The system of claim 1, wherein the providing the API request comprises:

determining, via the backend system of the digital wallet platform, a primary account number of the account from a contactless payment provider that performs the contactless payment processing.

6. The system of claim 1, wherein the proxy wallet data further comprises a cryptographic one-time password and an ephemeral public key associated with at least the payment processing service.

7. The system of claim 1, wherein the identifier is an identification number for a financial institution that is associated with a near field communications payment processing service, wherein the digital wallet platform requires a funding identifier for adding the account to the digital wallet, and wherein the funding identifier is supplied using the identification number from the proxy wallet data.

8. The system of claim 1, wherein, prior to the activating, the operations further comprise:

performing an eligibility check of at least one of the user or the account for use of the account via the digital wallet, wherein the activating is performed based on the eligibility check.

9. The system of claim 1, wherein the detecting the transfer comprises:

receiving a request for the transaction using the account, wherein the request for the transaction is routed to the payment processing service associated with the system using the identifier detokenized from the digital token.

10. The system of claim 1, wherein the payment processing service is associated with an installment payment service and validates transactions for the account during the contactless payment processing via the payment processing services on a single transaction basis based on one or more risk models.

11. A method comprising:

detecting a request to add an account of a user with a payment processing service to a digital wallet of the user, wherein the digital wallet is hosted by a digital wallet platform separate from a system associated with the payment processing service;

determining proxy wallet data for the account of the user, wherein the proxy wallet data comprises an identifier uniquely identifying the account to a backend payment processing network and that enables contactless payment processing via short range wireless communications using the account via the payment processing service;

transmitting the proxy wallet data to the digital wallet platform in association with the request;

identifying the account of the user with the backend payment processing network that utilizes the identifier for processing transactions with the payment processing service;

receiving, from the digital wallet platform, a digital certificate, a nonce generated by the digital wallet platform, and a nonce digital signature;

encrypting the digital certificate, the nonce, and the nonce digital signature;

providing, to a backend of the system, an application programming interface (API) request comprising the encrypted digital certificate, the encrypted nonce, and the encrypted nonce digital signature;

determining an encrypted identifier that represents the account in the digital wallet from an API response received from the backend of the system and based on the encrypted digital certificate, the encrypted nonce, and the encrypted nonce digital signature;

entering the encrypted identifier to a field that represents an account number during adding of the account to the digital wallet;

activating the payment processing service for the account with the digital wallet of the user;

generating a digital token associated with the digital wallet, wherein the digital token is transferred via the short range wireless communications for the contactless payment processing using the account;

enabling the contactless payment processing for the digital wallet in an application on a device of the user;

detecting a transfer of the digital token to a data processing terminal via the short range wireless communications; and processing a transaction having the digital token used for the contactless payment processing by the data processing terminal based on the transfer.

12. The method of claim 11, wherein the determining the proxy wallet data comprises receiving the API response from the backend of the system that generates the proxy wallet data.

13. The method of claim 11, wherein the proxy wallet data is encrypted prior to transmitting to the digital wallet platform using a cryptographic key associated with the digital wallet platform.

14. The method of claim 11, further comprising:

passing the request to a frontend application of the digital wallet platform that generates or retrieves the digital certificate using a backend system of the digital wallet platform.

15. The method of claim 11, wherein the providing the API request comprises:

determining, via the backend system of the digital wallet platform, a primary account number of the account from a contactless payment provider that performs the contactless payment processing.

16. The method of claim 11, wherein the proxy wallet data further comprises a cryptographic one-time password and an ephemeral public key associated with at least the payment processing service.

17. The method of claim 11, wherein the identifier is an identification number for a financial institution that is associated with a near field communications payment processing service, wherein the digital wallet platform requires a funding identifier for adding the account to the digital wallet, and wherein the funding identifier is supplied using the identification number from the proxy wallet data.

18. The method of claim 11, wherein, prior to the activating, the method further comprises:

performing an eligibility check of at least one of the user or the account for use of the account via the digital wallet, wherein the activating is performed based on the eligibility check.

19. The method of claim 11, wherein the detecting the transfer comprises:

receiving, via the short range wireless communications, a request for the transaction using the account, wherein the request is routed using the identifier detokenized from the token to the payment processing service associated with the system using the identifier detokenized from the digital token.

20. A non-transitory machine-readable medium having stored thereon machine-readable instructions executable to cause a machine to perform operations comprising:

detecting a request to add an account of a user with a payment processing service to a digital wallet of the user, wherein the digital wallet is hosted by a digital wallet platform separate from a system associated with the payment processing service;

determining proxy wallet data for the account of the user, wherein the proxy wallet data comprises an identifier uniquely identifying the account to a backend payment processing network and that enables contactless payment processing via short range wireless communications using the account via the payment processing service;

transmitting the proxy wallet data to the digital wallet platform in association with the request;

identifying the account of the user with the backend payment processing network that utilizes the identifier for processing transactions with the payment processing service;

receiving, from the digital wallet platform, a digital certificate, a nonce generated by the digital wallet platform, and a nonce digital signature;

encrypting the digital certificate, the nonce, and the nonce digital signature;

providing, to a backend of the system, an application programming interface (API) request comprising the encrypted digital certificate, the encrypted nonce, and the encrypted nonce digital signature;

determining an encrypted identifier that represents the account in the digital wallet from an API response received from the backend of the system and based on the encrypted digital certificate, the encrypted nonce, and the encrypted nonce digital signature;

entering the encrypted identifier to a field that represents an account number during adding of the account to the digital wallet;

activating the payment processing service for the account with the digital wallet of the user;

generating a digital token associated with the digital wallet, wherein the digital token is transferred via the short range wireless communications for the contactless payment processing using the account;

enabling the contactless payment processing for the digital wallet in an application on a device of the user;

detecting a transfer of the digital token to a data processing terminal via the short range wireless communications; and processing a transaction having the digital token used for the contactless payment processing by the data processing terminal based on the transfer.

* * * * *